United States Patent
Cho et al.

(10) Patent No.: US 12,337,283 B2
(45) Date of Patent: Jun. 24, 2025

(54) SPIRAL-WOUND FILTER MODULE EXHIBITING ALMOST NO HEAVY METAL LEACHING AND MANUFACTURING METHOD THEREOF

(71) Applicant: Toray Advanced Materials Korea Inc., Gyeongsangbuk-do (KR)

(72) Inventors: Sung Gun Cho, Gyeongsangbuk-do (KR); Sung Pyo Hong, Gyeongsangbuk-do (KR)

(73) Assignee: TORAY ADVANCED MATERIALS KOREA INC., Gyeongsangbuk-Do (KR)

( * ) Notice: Subject to any disclaimer, the term of this patent is extended or adjusted under 35 U.S.C. 154(b) by 229 days.

(21) Appl. No.: 17/232,008

(22) Filed: Apr. 15, 2021

(65) Prior Publication Data

US 2021/0322927 A1    Oct. 21, 2021

(51) Int. Cl.
*B01D 63/10* (2006.01)
*B01D 69/10* (2006.01)
(Continued)

(52) U.S. Cl.
CPC ........... *B01D 63/10* (2013.01); *B01D 63/107* (2022.08); *B01D 69/105* (2013.01);
(Continued)

(58) Field of Classification Search
CPC .... B01D 63/10; B01D 63/103; B01D 63/107; B01D 69/10; B01D 69/105; B01D 69/107; B01D 69/1071; B01D 69/1213; B01D 69/1216; B01D 69/125; B01D 71/48; B01D 63/1031; B01D 71/481; B01D 2313/08; B01D 2313/143; B01D 2313/146; B01D 61/025; B01D 61/027; B01D 61/145; B01D 61/147; B01D 71/56; B01D 71/68;
(Continued)

(56) References Cited

U.S. PATENT DOCUMENTS 5,425,877 A    6/1995    Knappe
7,138,058 B2   11/2006   Kurth et al.
(Continued)

FOREIGN PATENT DOCUMENTS

CN    1676203     10/2005
CN    102715170   10/2012
(Continued)

OTHER PUBLICATIONS

JP2000354743 A, English Machine Translation, Shintani (Year: 2000).*
(Continued)

*Primary Examiner* — Bobby Ramdhanie
*Assistant Examiner* — Boi-Lien Thi Nguyen
(74) *Attorney, Agent, or Firm* — MORRISON & FOERSTER LLP

(57) ABSTRACT

The present invention relates to a spiral-wound filter module exhibiting almost no heavy metal leaching and a manufacturing method thereof, and specifically, to a spiral-wound filter module, which can be used as a filter for producing safe drinking water by substantially reducing the amount of a heavy metal leached when immersed in water, and a manufacturing method thereof.

4 Claims, 1 Drawing Sheet

(51) Int. Cl.
*B01D 69/12* (2006.01)
*B01D 71/48* (2006.01)
*C02F 1/44* (2023.01)
*D01D 5/34* (2006.01)
*D01F 8/14* (2006.01)
*C02F 101/20* (2006.01)

(52) U.S. Cl.
CPC ......... *B01D 69/106* (2022.08); *B01D 69/107* (2022.08); *B01D 69/1071* (2022.08); *B01D 69/1213* (2022.08); *B01D 69/1216* (2022.08); *B01D 69/125* (2013.01); *B01D 71/48* (2013.01); *C02F 1/441* (2013.01); *C02F 1/442* (2013.01); *C02F 1/444* (2013.01); *D01D 5/34* (2013.01); *D01F 8/14* (2013.01); *B01D 63/1031* (2022.08); *B01D 71/481* (2022.08); *B01D 2313/08* (2013.01); *B01D 2313/143* (2013.01); *B01D 2313/146* (2013.01); *C02F 1/44* (2013.01); *C02F 2101/20* (2013.01)

(58) Field of Classification Search
CPC ............... B01D 2275/10; B01D 39/20; B01D 39/2024; B01D 39/2089; B01D 46/10; B01D 46/2411; B01D 46/521; B01D 46/71; B01D 61/18; B01D 69/02; B01D 69/12; B01D 2323/08; B01D 2323/081; B01D 2323/082; B01D 2323/48; B01D 2325/06; B01D 2325/20; B01D 2325/36; B01D 53/228; B01D 61/02; B01D 69/1251; B01D 71/34; B01D 2313/025; B01D 2313/12; B01D 2323/12; B01D 2325/26; B01D 46/0001; B01D 61/007; B01D 67/0006; B01D 2323/42; B01D 39/14; B01D 2239/10; B01D 29/216; B01D 29/58; B01D 35/02; B01D 39/1623; B01D 2201/02; B01D 2201/32; B01D 2239/065; B01D 2239/086; B01D 2239/1233; B01D 25/001; B01D 25/24; B01D 27/06; B01D 29/111; B01D 29/33; B01D 39/02; B01D 39/16; B01D 39/1607; B01D 46/528; B01D 46/64; B01D 61/00; B01D 2201/088; B01D 2239/0407; B01D 2239/0435; B01D 2239/0442; B01D 2239/0457; B01D 2239/0464; B01D 2239/0618; B01D 2239/064; B01D 2239/0695; B01D 2239/1216; B01D 2239/1241; B01D 2311/04; B01D 24/00; B01D 39/2055; B01D 39/2062; B01D 46/0004; B01D 46/0031; B01D 46/0032; B01D 46/2414; B01D 61/04; B01D 61/10; B01D 63/06; B01D 69/106; C02F 1/441; C02F 1/442; C02F 1/444; C02F 1/44; C02F 2101/20; C02F 1/62; C02F 1/001; C02F 2101/22; D01D 5/34; D01D 8/14; D01D 1/10; D01F 8/14; D01F 1/10
See application file for complete search history.

(56) References Cited

U.S. PATENT DOCUMENTS

| | | | | |
|---|---|---|---|---|
| 8,506,807 | B2* | 8/2013 | Lee | C02F 1/004 |
| | | | | 210/488 |
| 2002/0070158 | A1 | 6/2002 | Buecher et al. | |
| 2008/0032719 | A1 | 2/2008 | Rosenberg | |
| 2008/0185332 | A1 | 8/2008 | Niu et al. | |
| 2014/0083066 | A1* | 3/2014 | Bahukudumbi | B29C 71/0009 |
| | | | | 264/48 |
| 2015/0014244 | A1 | 1/2015 | Shimura et al. | |
| 2017/0144110 | A1 | 5/2017 | Shimura et al. | |
| 2018/0133658 | A1* | 5/2018 | Seo | B01D 69/148 |
| 2018/0264411 | A1 | 9/2018 | Herron | |
| 2019/0105208 | A1* | 4/2019 | Saevecke | A61F 13/537 |
| 2019/0217286 | A1* | 7/2019 | Miyamoto | C02F 1/42 |
| 2020/0040484 | A1* | 2/2020 | Watanabe | D01D 5/16 |
| 2021/0291119 | A1 | 9/2021 | Lee et al. | |
| 2022/0011630 | A1 | 1/2022 | Ko et al. | |
| 2022/0387936 | A1 | 12/2022 | Lee et al. | |
| 2023/0008479 | A1 | 1/2023 | Park et al. | |
| 2023/0347298 | A1 | 11/2023 | Lee | |

FOREIGN PATENT DOCUMENTS

| | | | | |
|---|---|---|---|---|
| CN | 102177447 | | 11/2013 | |
| CN | 105694053 | | 6/2016 | |
| CN | 105771672 | | 7/2016 | |
| DE | 202015005969 | U1 * | 11/2015 | ............. D01D 5/082 |
| EP | 1044718 | | 10/2000 | |
| EP | 2821126 | | 1/2016 | |
| JP | H 11-009921 | | 1/1999 | |
| JP | 2000-354743 | | 12/2000 | |
| JP | 2003-245530 | | 9/2003 | |
| JP | 2004-041870 | | 2/2004 | |
| JP | 2004-202409 | | 7/2004 | |
| JP | 2007-111606 | | 5/2007 | |
| JP | 2007-167783 | | 7/2007 | |
| JP | 4103131 | | 6/2008 | |
| JP | 2009-045595 | | 3/2009 | |
| JP | 2009-149573 | | 7/2009 | |
| JP | 2011-005455 | | 1/2011 | |
| JP | 2012-092475 | | 5/2012 | |
| JP | 2014-083515 | | 5/2014 | |
| JP | 2014-144441 | | 8/2014 | |
| JP | 2017-000939 | | 1/2017 | |
| JP | 2017-047417 | | 3/2017 | |
| JP | 2017-119932 | | 7/2017 | |
| JP | 2018-126706 | | 8/2018 | |
| KR | 10-0169484 | | 10/1998 | |
| KR | 10-0340277 | | 1/2001 | |
| KR | 10-0401248 | | 11/2001 | |
| KR | 10-2002-0001307 | | 1/2002 | |
| KR | 10-0406735 | | 8/2002 | |
| KR | 10-2006-0011043 | | 2/2006 | |
| KR | 10-2008-0032604 | | 4/2008 | |
| KR | 10-0865625 | | 10/2008 | |
| KR | 10-2009-0014302 | | 2/2009 | |
| KR | 20090015087 | A * | 11/2009 | |
| KR | 10-2010-0008213 | | 1/2010 | |
| KR | 10-2010-0131423 | | 12/2010 | |
| KR | 10-2011-0109387 | | 10/2011 | |
| KR | 10-2012-0087416 | | 8/2012 | |
| KR | 10-2012-0098741 | | 9/2012 | |
| KR | 20120137890 | A * | 12/2012 | |
| KR | 10-2013-0000477 | | 1/2013 | |
| KR | 10-2014-0021270 | | 2/2014 | |
| KR | 10-2014-0046952 | | 4/2014 | |
| KR | 10-2014-0092306 | | 7/2014 | |
| KR | 10-2015-0077062 | | 7/2015 | |
| KR | 10-2015-0079168 | | 7/2015 | |
| KR | 10-2015-0079170 | | 7/2015 | |
| KR | 10-2015-0083048 | | 7/2015 | |
| KR | 10-1541654 | | 8/2015 | |
| KR | 10-2016-0037584 | | 4/2016 | |
| KR | 10-2016-0081606 | | 7/2016 | |
| KR | 10-2017-0103541 | | 9/2017 | |
| KR | 20170103541 | A * | 9/2017 | |
| KR | 10-2017-0112994 | | 10/2017 | |
| KR | 10-2017-0126693 | | 11/2017 | |
| KR | 10-2018-0111704 | | 10/2018 | |
| KR | 10-1966114 | | 8/2019 | |
| TW | I467249 | | 1/2015 | |

(56) References Cited

FOREIGN PATENT DOCUMENTS

| WO | WO 2007/140163 | 12/2007 |
| WO | WO 2013/058986 | 4/2013 |

OTHER PUBLICATIONS

KR20090015087 A, English Machine Translation, Togawa (Year: 2009).*
DE202015005969 U1, English machine translation, Freudenberg (Year: 2015).*
Royal Society of Chemistry, Antimony, Oct. 2019 (Year: 2019).*
JP2007167783 A, English machine translation, Jizo (Year: 2007).*
JP2017119932 A. English machine translation, Nakano (Year: 2017).*
KR20170103541 A, English machine translation, Choi (Year: 2017).*
Choi, KR20170103541 A., English machine translation (Year: 2017).*
Density Periodic Table—Periodic Table Wallpaper (Year: 2017).*
U.S. Appl. No. 17/761,146, filed Mar. 16, 2022, by Lee et al. (copy not provided).
U.S. Appl. No. 17/761,564, filed Mar. 17, 2022, by Lee et al. (copy not provided).
U.S. Appl. No. 17/772,997, filed Apr. 28, 2022, by Park et al. (copy not provided).
U.S. Appl. No. 17/788,040, filed Jun. 22, 2022, by Yoon et al. (copy not provided).
Ramadan et al. "Review on Recent Applications of Antimicrobial Agents for Polyamide and Polypropylene." *Al-Azhar Bulletin of Science* (2012) 23.2-A: 1-28.

* cited by examiner

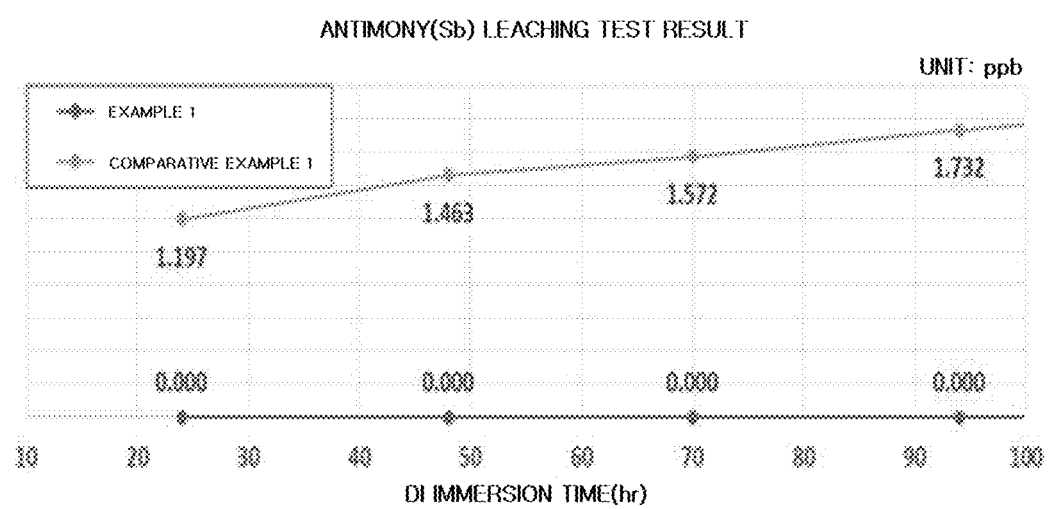

SPIRAL-WOUND FILTER MODULE EXHIBITING ALMOST NO HEAVY METAL LEACHING AND MANUFACTURING METHOD THEREOF

CROSS-REFERENCE TO RELATED APPLICATION

This application claims priority to and the benefit of Korean Patent Application No. 10-2020-0046776, filed on Apr. 17, 2020, the disclosure of which is incorporated herein by reference in its entirety.

BACKGROUND

1. Field of the Invention

The present invention relates to a spiral-wound filter module exhibiting almost no heavy metal leaching and a manufacturing method thereof, and specifically, to a spiral-wound filter module, which can be used as a filter for producing safe drinking water by substantially reducing the amount of a heavy metal leached when immersed in water, and a manufacturing method thereof.

2. Discussion of Related Art

As the treatment technology for clear water and sewage/wastewater is developed, the direction of the treatment technology has been changed from a conventional sand filtration method to a membrane filtration method using a separation membrane.

The separation membrane technology for water treatment is high-level separation/filtration water treatment technology for almost completely separating and removing target substances present in water to be treated according to the pore size and pore distribution of the membrane and the charge on the membrane surface.

Separation membranes for water treatment, which are key components in the water treatment technology, are classified into microfiltration (MF) membranes, ultrafiltration (UF) membranes, nanofiltration (NF) membranes, and reverse osmosis (RO) membranes according to the pore size thereof. In the field of water treatment, applications of separation membranes have been expanded to processes such as the production of high-quality drinking water and industrial water, the treatment and reuse of sewage/wastewater, a clean production process related to the development of a zero-discharge system, and the like. The filtration membrane technology for water treatment is a key technology that has attracted attention in recent years in line with the recent situation where water pollution is becoming more severe, and since people use the tap water supplied after purification treatment as drinking water by re-treating the tap water through a water purifier, there is an urgent need for technology development therefor.

Meanwhile, a water purifier system consists of a filter module, pre-treatment and post-treatment filters, a pump, a tube, a tank, and other auxiliary devices, and, among components constituting the system, the filter module is most important.

As the filter module, flat plate-type, hollow fiber-type, tube-type, spiral-wound filter modules, and the like have been commercialized, and research is being mainly conducted on a spiral-wound separation membrane module having high insertion density per unit area of a separation membrane and capable of removing ions in water.

The spiral-wound filter module consists of a separation membrane and a flow channel, both of which are spirally wound. In this case, a filtered-water flow channel made of a polyester fabric mainly includes a polyester fiber formed by condensation polymerization using an antimony (Sb)-based catalyst, and when filtered water is stagnant for a long period of time, safety problems occur due to leaching of antimony. Therefore, to provide safer drinking water, there is a need to develop technology capable of suppressing the leaching of a heavy metal.

RELATED-ART DOCUMENTS

Patent Documents (Patent Document 1) KR2017-0112994 A

SUMMARY OF THE INVENTION

The present invention is directed to providing a spiral-wound filter module, which is a filter for producing drinking water and is capable of substantially reducing the amount of heavy metal leached into filtered water, and a manufacturing method thereof.

One aspect of the present invention provides a spiral-wound filter module which includes: a filtered-water flow channel sheet including a fabric exhibiting almost no heavy metal leaching, which includes a polyester fiber and allows a heavy metal having an atomic weight of 63 g/mol to 200 g/mol and a density of 4 $g/cm^3$ or more to be leached in an amount of 1 ppb or less, as measured according to Measurement Method below; a separation membrane sheet; and an influent-water flow channel sheet.

[Measurement Method]

A specimen prepared by cutting the fabric exhibiting almost no heavy metal leaching so as to have a weight of 0.7 g is immersed in 1,000 g of deionized water (DI water) having a purity of 99.9% or more for 100 hours and then taken out, and the concentration of a metal element leached into the deionized water is measured.

According to an exemplary embodiment of the present invention, the fabric exhibiting almost no heavy metal leaching may be a tricot fabric formed by knitting the polyester fiber.

According to an exemplary embodiment of the present invention, the polyester fiber may be a sheath-core fiber, and a melting point of a core-part polyester resin may be higher than a melting point of a sheath-part polyester resin.

According to an exemplary embodiment of the present invention, the sheath-part polyester resin may have a melting point of 150° C. to 220° C.

According to an exemplary embodiment of the present invention, the core-part polyester resin and the sheath-part polyester resin may be polymerized using a polymerization catalyst including only a titanium (Ti)-based catalyst.

According to an exemplary embodiment of the present invention, the polyester fiber may contain antimony (Sb) in an amount of 1 ppm or less.

According to an exemplary embodiment of the present invention, the spiral-wound filter module may be in the form in which a laminate formed by sequentially laminating: a first separation membrane sheet including the separation membrane sheet; the filtered-water flow channel sheet; a second separation membrane sheet including the separation membrane sheet; and the influent-water flow channel sheet one or more times is spirally wound.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 shows antimony leaching test results of a fabric exhibiting almost no heavy metal leaching according to the present invention and a polyester tricot fabric according to a comparative example.

DETAILED DESCRIPTION OF EXEMPLARY EMBODIMENTS

Hereinafter, the present invention will be described in more detail.

As described above, a conventional spiral-wound filter module has a problem of drinking water contamination caused by leaching a heavy metal from a fabric for a filtered-water flow channel sheet into filtered water.

Accordingly, the present invention aims to solve the problem by providing a spiral-wound filter module which includes: a filtered-water flow channel sheet including a fabric exhibiting almost no heavy metal leaching, which includes a polyester fiber and allows a heavy metal having an atomic weight of 63 g/mol to 200 g/mol and a density of 4 g/cm$^3$ or more to be leached in an amount of 1 ppb or less, as measured according to the following Measurement Method; a separation membrane sheet; and an influent-water flow channel sheet.

[Measurement Method]

A specimen prepared by cutting the fabric exhibiting almost no heavy metal leaching so as to have a weight of 0.7 g is immersed in 1,000 g of deionized water (DI water) having a purity of 99.9% or more for 100 hours and then taken out, and the concentration of a metal element leached into the deionized water is measured.

According to guidelines (2017) for drinking-water quality standards of the Ministry of Environment of the Republic of Korea, heavy metals registered as water quality standard items contained in drinking water include lead (Pb), mercury (Hg), chromium (Cr), cadmium (Cd), and copper (Cu), and heavy metals registered as drinking-water quality monitoring items include antimony (Sb) and uranium (Ur). Among them, especially, Sb is a component with harmful characteristics, which may cause digestive system irritation and burns, abdominal pain, vomiting, diarrhea, hypotension, and the like and causes skin irritation and the like. In addition, Sb is a heavy metal component requiring special attention because Sb is easily leached from an antimony catalyst remaining in the preparation of a polyester component of a filtered-water flow channel used in the filter module during a process of filtering influent water through a filter to remove other contaminants contained in drinking water.

According to the guidelines (2017) for drinking-water quality standards, water quality monitoring standards for antimony show antimony needs to be contained in an amount of about 20 ppb or less.

The polyester fiber is typically formed by esterification (condensation polymerization) of an acid (dicarboxylic acid) component and a diol component, and in this case, an antimony-based catalyst is mainly used in an industrial process.

Examples of the antimony-based catalyst include antimony trioxide ($Sb_2O_3$), antimony oxalate, antimony glucoxide, and antimony butoxide. When the polyester fiber is formed by polymerization using the antimony-based catalyst, the antimony-based catalyst remaining after the formation causes a problem in which antimony contained in the filter module is leached into filtered water during use of the filter.

The polyester fiber formed by polymerization using the antimony-based catalyst is used in the filtered-water flow channel disposed between separation membranes in the spiral-wound filter module, and the flow channel is provided as a sheet-type fabric and serves as a channel for flowing filtered water between separation membranes.

According to the present invention, since the filtered-water flow channel sheet including a fabric exhibiting almost no heavy metal leaching, which includes a polyester fiber and allows a heavy metal to be leached in a small amount, is used as described above, the drinking-water quality monitoring standards in accordance with the notice of the Ministry of Environment of the Republic of Korea can be satisfied, and safe drinking water can be provided.

When the leaching amount exceeds 1 ppb as measured by the above Measurement Method or when the amount of a heavy metal leached into influent water remaining in the filter is increased by leaving a water purifier unattended for a long period of time due to a vacation, travel, and the like, the water quality monitoring standards in accordance with the notice of the Ministry of Environment of the Republic of Korea are not satisfied, leading to a difficulty in use as safe drinking water.

Hereinafter, each component of the present invention will be described in more detail.

The present invention relates to a spiral-wound filter module, and a separation membrane sheet and a filtered-water flow channel sheet are key components.

1. Separation Membrane Sheet

A separation membrane refers to a separation membrane such as a microfiltration (MF) membrane, an ultrafiltration (UF) membrane, a nanofiltration (NF) membrane, a reverse osmosis (RO) membrane, and the like, as described above, and serves to substantially filter contaminants present in influent water. Since micropores are present in the separation membrane, the separation membrane serves to filter contaminants through adsorption.

The separation membrane may be selected from among a microfiltration (MF) membrane, an ultrafiltration (UF) membrane, a nanofiltration (NF) membrane, a reverse osmosis (RO) membrane, and the like depending on the area of application of the filter module.

The separation membrane preferably includes a porous support layer and a polyamide layer formed on at least one surface of the porous support layer.

The porous support layer is preferably a nonwoven fabric or a woven fabric.

In addition, the porous support layer preferably has a thickness of 100 μm to 250 μm. When the thickness of the porous support layer is less than 100 μm, the thickness of a laminate of the separation membrane sheet and the flow channel sheet is excessively decreased, and thus the durability of the filter may be degraded. On the other hand, when the thickness of the porous support layer exceeds 250 μm, the thickness of the polyamide layer formed by penetration into the pores of the porous support layer is excessively increased, and thus the permeate flow rate of filtered water may be degraded.

2. Filtered-Water Flow Channel Sheet

The filtered-water flow channel sheet is attached to the separation membrane sheet and thus provides a passage through which filtered water passes.

The filtered-water flow channel sheet is a porous sheet and includes a fabric exhibiting almost no heavy metal leaching, which includes a polyester fiber.

"Exhibiting almost no heavy metal leaching" does not mean that heavy metals are never leached but means that heavy metals are leached at a low concentration of 1 ppb or less as measured by the following Measurement Method.

[Measurement Method]

A specimen is prepared using the fabric exhibiting almost no heavy metal leaching so as to have a weight of 0.7 g, then immersed in 1,000 g of deionized water (DI water) having a purity of 99.9% or more for 100 hours, and taken out, and the concentration of a metal element leached into the resulting deionized water is measured.

In the specification, a heavy metal refers to a metal element having an atomic weight of 63 g/mol to 200 g/mol and a density of 4 g/cm$^3$ or more.

Preferably, the leaching amount of a heavy metal refers to a leaching amount of antimony (Sb, atomic weight of: 121.760 g/mol, density of: 6.697 g/cm$^3$) as measured by the above Measurement Method.

Since a small amount of heavy metal is leached as described above, the concentration of a heavy metal leached into water remaining in the filter may be substantially lowered, and thus a filter suitable for providing safe drinking water may be implemented. In the case of a filter conventionally used in a water purifier, when the water purifier is not used for a long period of time due to travel, the amount of a heavy metal leached into filtered water that has been stagnant in the filter for a long period of time is increased, and thus the leaching amount exceeds water quality monitoring standards.

According to an exemplary embodiment of the present invention, the fabric exhibiting almost no heavy metal leaching may be a woven fabric formed by weaving the polyester fiber, a knitted fabric formed by knitting the polyester fiber, or a nonwoven fabric including the polyester fiber. Preferably, the fabric is a tricot fabric formed by knitting the polyester fiber.

The polyester fiber is preferably a polyester fiber exhibiting almost no heavy metal leaching. More preferably, the polyester fiber is a polyester fiber exhibiting almost no antimony leaching. That is, the polyester fiber may be a polyester fiber having a substantially low antimony content compared to a conventional polyester fiber.

The polyester fiber is preferably formed by spinning a polyester resin prepared by polymerization of an acid (dicarboxylic acid) component and a diol component using a polymerization catalyst not including an antimony-based catalyst.

Preferably, the polymerization catalyst consists of a titanium (Ti)-based catalyst. That is, the polymerization catalyst may include only a titanium-based catalyst.

The titanium-based catalyst preferably includes a compound represented by the following Chemical Formula 1.

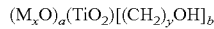   [Chemical Formula 1]

In Chemical Formula 1, M is any one alkali metal selected from among lithium (Li), sodium (Na), potassium (K), calcium (Ca), rubidium (Rb), magnesium (Mg), strontium (Sr), and barium (Ba), x is 1 or 2, a is a rational number satisfying $0.001 \leq a \leq 0.1$, y is an integer satisfying $1 \leq y \leq 10$, and b is a rational number satisfying $1 \leq b \leq 100$.

Consequently, the polyester fiber preferably contains antimony in an amount of 1 ppb or less, and thus the leaching amount of antimony, as measured by the above Measurement Method, may be reduced.

The polyester fiber is preferably a sheath-core composite fiber, and the melting point of a core-part polyester resin may be higher than the melting point of a sheath-part polyester resin. The sheath-core fiber refers to a composite fiber consisting of a core part constituting the central portion of the fiber and a sheath part surrounding the core part.

Therefore, a sheet having excellent strength compared to a flow channel sheet including a conventional polyester fiber may be provided.

Preferably, the sheath-part polyester resin is a low-melting-point polyester resin having a melting point of 150° C. to 220° C. Also, the core-part polyester resin preferably has a melting point of 200° C. to 300° C.

The sheath-part polyester resin and the core-part polyester resin are resins typically used in the sheath part and core part of a composite fiber, and there is no limitation on the polyester resins as long as they are used in the art.

Preferably, the sheath-part polyester resin is prepared by esterification and condensation polymerization of an acid component and a diol component in the presence of a polymerization catalyst including a titanium-based catalyst and no antimony-based catalyst.

Preferably, the sheath-part polyester resin is prepared by performing esterification of a mixture of the acid component and the diol component mixed in a molar ratio of 1:0.8 to 1:2.2, and preferably, 1:1 to 1:2, at 200° C. to 300° C., and preferably, 230° C. to 270° C., with the addition of the polymerization catalyst at 2 ppm to 500 ppm, and preferably, 50 ppm to 200 ppm with respect to 100 parts by weight of the mixture and then performing condensation polymerization at 230° C. to 320° C., and preferably, 260° C. to 305° C.

The acid component used in the polymerization of the sheath-part polyester resin preferably includes one or more selected from among terephthalic acid (TPA) and isophthalic acid (IPA). In addition, the diol component preferably includes one or more selected from among 1,2-ethandiol, 1,3-propandiol, 1,4-butandiol, and isopropanol.

However, the acid component compound and the diol component compound are not limited to those listed above and may be selected from among monomers for polyester polymerization, which are capable of preparing a sheath-part polyester resin satisfying the above-described properties and typically used in the art, without limitation.

When a temperature condition for the esterification is less than 200° C., the heat of reaction between the mixture and the catalyst is not sufficient, and thus condensation polymerization may not occur, or a low-molecular weight condensation polymerization product may be produced, leading to low strength and a difficulty in fiberization. On the other hand, when the temperature condition exceeds 300° C., a condensation polymerization product is decomposed due to a high heat of reaction, and thus it may be difficult to obtain a desired high-molecular weight condensation polymerization product, or by-products produced due to the high heat of reaction rather than the decomposition, such as diethylene glycol and various dimers, may cause degradation of the strength of the produced condensation polymerization product and a yellowing phenomenon.

In addition, when a temperature for performing the condensation polymerization is less than 230° C., the heat of reaction between the mixture and the catalyst is not sufficient, and thus condensation polymerization may not occur, or a low-molecular weight condensation polymerization product may be produced, leading to low strength and a difficulty in fiberization. On the other hand, when the temperature exceeds 320° C., thermal decomposition occurs, and thus the properties of a polyester fabric exhibiting almost no heavy metal leaching may be degraded.

Additionally, when the acid component and the alcohol component is in a molar ratio of less than 1:0.8, it may be difficult to produce a desired high-molecular weight condensation polymerization product or fiberize the produced condensation polymerization product. On the other hand, when the molar ratio is more than 1:2.2, by-products are excessively produced, and thus unreacted substance residues may cause yarn breakage and an increase in pack pressure in a spinning process, leading to substantially degraded spinnability.

In addition, when the catalyst is added at less than 2 ppm with respect to 100 parts by weight of the mixture of the acid component compound and the diol component compound, reactivity is degraded, and thus it may be difficult to prepare a sheath-part polyester resin. On the other hand, when the catalyst is added at more than 500 ppm, reactivity is increased, but a coloring phenomenon may increasingly occur due to yellowing.

Meanwhile, the catalyst may be added at the beginning of the esterification, and accordingly, the reaction activation time may be delayed. To compensate for the delay problem, before polymerization, the catalyst may be pre-heated under a nitrogen atmosphere at 140° C. to 200° C., and preferably, 150° C. to 190° C., for 1 hour to 3 hours, and preferably, 1.5 hours to 2.5 hours to increase activity, but the temperature and time are not limited thereto.

In addition, according to an exemplary embodiment of the present invention, the core-part polyester resin may be prepared by condensation polymerization of an acid component compound and a diol component compound in the presence of a polymerization catalyst including a titanium-based catalyst and no antimony-based catalyst. Specifically, the core-part polyester resin may be prepared by mixing an acid component compound and a diol component compound in a molar ratio of 1:1 to 1:2, and preferably, 1:1.1 to 1:1.9, at 200° C. to 300° C., and preferably, 230° C. to 270° C., performing esterification with addition of the polymerization catalyst at 2 ppm to 500 ppm, and preferably, 50 ppm to 200 ppm with respect to 100 parts by weight of the mixture, and then performing condensation polymerization at 230° C. to 320° C., and preferably, 260° C. to 305° C.

In the condensation polymerization, a color complementing agent or a thermal stabilizer may be further added. As the color complementing agent, cobalt acetate, an anthraquinone-based dye, or the like may be used. The color complementing agent may be added at 10 ppm to 200 ppm with respect to the weight of the sheath-part polyester resin. When the content of the color complementing agent is less than 10 ppm, it may be difficult to obtain a predetermined color, and when the content of the color complementing agent exceeds 200 ppm, a chromaticity value is decreased, particularly, due to an increase in cobalt acetate content, and thus the color of polyester may become darker, and glossiness may be reduced. Meanwhile, when the anthraquinone-based dye is used, the anthraquinone-based dye may be added at 0.01 ppm to 10 ppm with respect to the weight of the sheath-part polyester resin. When the content of the anthraquinone-based dye is less than 0.01 ppm, a predetermined color may not be obtained, and when the content of the anthraquinone-based dye exceeds 10 ppm, the color may become green or dark blue, making it difficult to use. Preferably, the anthraquinone-based dye is used as the color complementing agent, but the present invention is not limited thereto.

In addition, as the thermal stabilizer, one or more selected from among triphenyl phosphate (TPP), triethyl phosphate (TEP), phosphoric acid ($H_3PO_4$), and trimethyl phosphate (TMP) may be used. The thermal stabilizer may be added at 100 ppm to 400 ppm with respect to the weight of the sheath-part polyester resin. When the content of the thermal stabilizer is less than 100 ppm, it may be difficult for the thermal stabilizer to function as a thermal stabilizer and thermal decomposition may be caused in post-processing, and when the content of the thermal stabilizer exceeds 400 ppm, thermal stability is improved, but the thermal stabilizer may cause degradation of reactivity in the polymerization. However, the content range is not necessarily limited thereto.

The acid component compound used in the polymerization of the core-part polyester resin preferably includes one or more selected from among terephthalic acid and isophthalic acid, and the diol component compound includes one or more selected from among 1,2-ethandiol, 1,3-propandiol, 1,4-butandiol, and isopropanol. However, the present invention is not necessarily limited thereto, and the acid component compound and the diol component compound may be selected from among monomer compounds used in the preparation of a polyester fiber, particularly, a polyethylene terephthalate (PET) fiber, in the art.

When the acid component compound and the diol component compound are mixed in a molar ratio of less than 1:1, it may be difficult to obtain a desired high-molecular weight condensation polymerization product or fiberize the produced condensation polymerization product. On the other hand, when the molar ratio is more than 1:2, by-products are excessively produced, and thus unreacted substance residues may cause yarn breakage and an increase in pack pressure in a spinning process, leading to substantially degraded spinnability.

In addition, when the catalyst is added at less than 2 ppm with respect to 100 parts by weight of the mixture of the acid component compound and the diol component compound, reactivity is degraded, and thus it may be difficult to prepare a core-part polyester resin. On the other hand, when the catalyst is added at more than 500 ppm, reactivity is increased, but a coloring phenomenon may increasingly occur due to yellowing.

Additionally, when a temperature for performing the condensation polymerization is less than 230° C., the temperature is lower than the melting point of the core-part polyester resin, and thus the condensation polymerization may not occur. On the other hand, when the temperature exceeds 320° C., it may be difficult to obtain a high-molecular weight resin due to a high-temperature decomposition reaction, and the resin may be carbonized during the high-temperature reaction.

Meanwhile, the catalyst may be added at the beginning of the esterification, and accordingly, the reaction activation time may be delayed. To compensate for the delay problem, before polymerization, the catalyst may be pre-heated under a nitrogen atmosphere at 140° C. to 200° C., and preferably, 150° C. to 190° C., for 1 hour to 3 hours, and preferably, 1.5 hours to 2.5 hours to increase activity, but the present invention is not limited thereto.

In addition, in the polymerization, a color complementing agent, a thermal stabilizer, and the like may be added. As the color complementing agent, cobalt acetate, an anthraquinone-based dye, or the like may be used. The color complementing agent may be added at 10 ppm to 200 ppm with respect to the weight of the core-part polyester resin. When the content of the color complementing agent is less than 10 ppm, a predetermined color may not be obtained, and when the content of the color complementing agent exceeds 200 ppm, a chromaticity value is decreased, particularly, due to an increase in cobalt acetate content, and thus the color of polyester may become darker, and glossiness may be reduced. Meanwhile, when the anthraquinone-based dye is used, the anthraquinone-based dye may be added at 0.01 ppm to 10 ppm with respect to the weight of the core-part polyester resin. When the content of the anthraquinone-based dye is less than 0.01 ppm, it may be difficult to obtain a predetermined color, and when the content of the anthraquinone-based dye exceeds 10 ppm, the color may become green or dark blue, making it difficult to use. Preferably, the anthraquinone-based dye is used as the color complementing agent, but the present invention is not limited thereto. In addition, as the thermal stabilizer, one or more selected from among triphenyl phosphate (TPP), triethyl phosphate (TEP), phosphoric acid ($H_3PO_4$), and trimethyl phosphate (TMP) may be used. The thermal stabilizer may be added at 100 ppm to 400 ppm. When the content of the thermal stabilizer is less than 100 ppm, it may be difficult for the thermal stabilizer to function as a thermal stabilizer and thermal decomposition may be caused in post-processing, and when the content of the thermal stabilizer exceeds 400 ppm, thermal stability is improved, but the thermal stabilizer may cause degradation of reactivity in the polymerization. However, the content range is not limited thereto.

The esterification of the sheath-part polyester resin and the core-part polyester resin is preferably performed at a pressure of 1,000 Torr to 1,300 Torr, and the condensation polymerization may be performed while slowly reducing the pressure until the final pressure is in a range of 0.3 Torr to 0.7 Torr, but the present invention is not necessarily limited thereto.

The polyester fiber of the present invention may be formed by composite spinning of the sheath-part polyester resin and the core-part polyester resin. The composite spinning may be performed by melt-spinning the sheath-part polyester resin and the core-part polyester resin in a weight ratio of 1:0.67 to 1:1.43, and preferably, 1:0.8 to 1:1.25.

The fabric exhibiting almost no heavy metal leaching, which is included in the flow channel sheet of the present invention, is formed by weaving or knitting the polyester fiber or processing the polyester fiber into a nonwoven fabric.

In addition, thermal treatment is preferably performed in the formation of the fabric exhibiting almost no heavy metal leaching.

Preferably, before the thermal treatment, cooling the polyester fiber having been subjected to composite spinning and stretching the cooled spinning product are further included, but the present invention is not necessarily limited thereto.

The thermal treatment may be performed at a temperature equal to or higher than the melting point of the sheath-part polyester resin for 10 seconds to 10 minutes.

The thermal treatment is preferably performed at 150° C. to 250° C., and more preferably, 170° C. to 250° C., for 10 seconds to 5 minutes, and more preferably, 30 seconds to 3 minutes. Through the thermal treatment, at least a portion of the sheath part of the polyester fiber is melted, and thus fusion between fibers may occur. As a result, the mechanical strength and durability of the completed filtered-water flow channel sheet may be improved, and the pore size may be adjusted.

When a temperature of the thermal treatment is lower than the melting point of the sheath-part polyester resin, the sheath part is not melted, and thus the strength of the fabric exhibiting almost no heavy metal leaching may be degraded, and when the temperature exceeds 250° C., both the sheath-part and core-part polyester resins may be melted. Also, when the thermal treatment time is less than 10 seconds, the sheath-part polyester resin may not be melted well, and when the thermal treatment time exceeds 10 minutes, the sheath-part polyester resin may be excessively melted.

3. Influent-Water Flow Channel Sheet

In addition to the above-described components, the spiral-wound filter module according to the present invention also includes an influent-water flow channel sheet. The influent-water flow channel sheet serves to provide a flow channel for influent water flowing into the filter, and the influent water is filtered by passing through the separation membrane sheet and then passes through the filtered-water flow channel sheet.

As the influent-water flow channel sheet, the same sheet as the filtered-water flow channel sheet is preferably used. However, the present invention is not necessarily limited thereto, and those skilled in the art are able to easily select a suitable sheet from among sheets used as an influent-water flow channel in the art according to the purpose of use.

The spiral-wound filter module according to the present invention may be in the form in which a laminate formed by sequentially laminating: a first separation membrane sheet; a filtered-water flow channel sheet; a second separation membrane sheet; and an influent-water flow channel sheet one or more times is spirally wound. In this case, the spiral wound type refers to a form in which the filter module is rolled like a scroll.

The first separation membrane sheet and the second separation membrane sheet are preferably the same or different from each other. Preferably, the first separation membrane sheet and the second separation membrane sheet are each independently the separation membrane sheet according to the present invention.

That is, the spiral-wound filter module according to the present invention is manufactured by the steps of (1) sequentially laminating a first separation membrane sheet; a filtered-water flow channel sheet consisting of a fabric exhibiting almost no heavy metal leaching; a second separation membrane sheet; and an influent-water flow channel sheet one or more times to form a laminate; and (2) spirally winding the laminate.

Detailed descriptions of the first separation membrane sheet, the filtered-water flow channel sheet, the second separation membrane sheet, and the influent-water flow channel sheet have been described above and therefore will be omitted.

Specifically, the spiral-wound filter module according to the present invention may be manufactured by repeating, one or more times, a lamination process of: preparing the first separation membrane sheet and the filtered-water flow channel sheet which have the same width; placing the filtered-water flow channel sheet on one surface of the separation membrane sheet; applying an predetermined amount of an adhesive to the ends of the other three surfaces except the one among the four surfaces; placing the second separation membrane sheet and the influent-water flow channel sheet, which have the same width, thereon; and applying an adhesive in the same manner and then rolling the resulting laminate while applying a predetermined pressure.

Hereinafter, the present invention will be described in more detail with reference to the following examples. However, it should be clear that the following examples are merely presented to exemplify the present invention, and the scope of the present invention is not limited to the following examples.

EXAMPLES

Example 1

Terephthalic acid (TPA) as an acid component compound and 1,4-butandiol as a diol component compound were mixed in a molar ratio of 1:1.5, a titanium-based catalyst represented by Chemical Formula 2 below was added at 150 ppm with respect to 100 parts by weight of the mixture, and esterification was performed at a temperature of 270° C. and a pressure of 1,200 Torr. Subsequently, condensation polymerization was performed at 270° C. while reducing the pressure to 0.5 Torr, thereby preparing a core-part polyester resin having a melting point of 255° C.

$$(M_2O)_{0.01}(TiO_2)[(CH_2)_8OH]_{20}$$ [Chemical Formula 2]

TPA as an acid component compound and 1,2-ethandiol as a diol component compound were mixed in a molar ratio of 1:1, the catalyst represented by Chemical Formula 2 was added at 150 ppm with respect to the weight of the mixture, and esterification was performed at a temperature of 250° C. and a pressure of 1,100 Torr. Subsequently, condensation polymerization was performed at 285° C. while reducing the pressure to 0.5 Torr, thereby preparing a sheath-part polyester resin having a melting point of 180° C.

To form a polyester composite fiber, the sheath-part polyester resin and the core-part polyester resin were input into a core-sheath-type composite spinneret in a weight ratio of 1:1 and melt-spun to prepare a sheath-core polyester composite fiber.

The sheath-core polyester composite fiber was used to prepare a greige, and the greige was pre-treated using a batch-type pretreatment machine at 200° C. for 15 minutes to prepare a tricot fabric. Then, the tricot fabric was input into a mini tenter (DL-2015 commercially available from Daelim Starlet Co. Ltd.) and thermally treated at 180° C. for 30 seconds to prepare the thermally treated fabric exhibiting almost no heavy metal leaching.

Examples 2 to 9 and Comparative Example 1

Fabrics exhibiting almost no heavy metal leaching were prepared in the same manner as in Example 1 by varying conditions as shown in the following Table 1.

TABLE 1

| Classification | Core-part polyester resin Catalyst (type/content) | Sheath-part polyester resin Catalyst (type/content) | Thermal treatment conditions Temperature (° C.) | Time (sec) |
|---|---|---|---|---|
| Example 1 | Chemical Formula 2 150 | Chemical Formula 2 150 | 180 | 30 |
| Example 2 | Chemical Formula 2 150 | Chemical Formula 2 150 | 120 | 30 |
| Example 3 | Chemical Formula 2 150 | Chemical Formula 2 150 | 270 | 30 |
| Example 4 | Chemical Formula 2 150 | Chemical Formula 2 150 | 180 | 10 |
| Example 5 | Chemical Formula 2 150 | Chemical Formula 2 150 | 180 | 60 |
| Example 6 | Chemical Formula 2 150 | Chemical Formula 2 150 | 180 | 100 |
| Example 7 | Absent | Chemical Formula 2 150 | 180 | 30 |
| Example 8 | Chemical Formula 2 1 | Chemical Formula 2 1 | 180 | 30 |
| Example 9 | Chemical Formula 2 1000 | Chemical Formula 2 1000 | 180 | 30 |
| Comparative Example 1 | Sb catalyst* 150 | Sb catalyst* 150 | 180 | 30 |

*The Sb catalyst was antimony trioxide ($Sb_2O_3$).

EXPERIMENTAL EXAMPLES

Experimental Example 1: Test for Strength

The adhesive strength of the tricot fabrics prepared according to the examples and comparative example was measured. Specifically, a specimen was prepared by cutting each of the tricot fabrics according to the examples and comparative example into a size of 100 mm (L)×20 mm (W)×10 mm (D) and tested 15 times at a tensile testing rate of 500 mm/min using a fiber tensile tester (UMT commercially available from Instron). The adhesive strength value was determined by analyzing the average of 13 measurement values excluding the maximum and minimum values among 15 measurement values. Results thereof are shown in Table 2 below.

Experimental Example 2: Test for Antimony Leaching Amount

The antimony leaching amount of the tricot fabrics prepared according to Example 1 and Comparative Example 1 was measured. Specifically, deionized water (DI water) having a purity of 99.9% and the tricot fabric specimens were provided. In this case, each specimen had a weight of 0.7 g.

Each of the specimens was immersed in the deionized water and allowed to stand at room temperature. 24 hours, 48 hours, 70 hours, and 90 hours later, the amount of antimony leached into the deionized water was measured using an inductively coupled plasma mass spectrometer (ICP-MS; NexION 300X commercially available from Perkin Elmer). Results thereof are shown in FIG. 1 and Table 2 below.

Referring to FIG. 1, as a result of the leaching test of the tricot fabric according to Example 1, it can be seen that antimony was leached in an amount of 1 ppb or less, that is, only at a level that was hardly detected, even when 100 hours had elapsed. On the other hand, as a result of the leaching test of the tricot fabric according to Comparative Example 1 which was prepared by polymerization of a polyester resin using an antimony-based catalyst, it can be seen that a leaching amount that is almost twice as high as 1 ppb, which is the standard, was measured 100 hours after the immersion.

TABLE 2

| Classification | Strength (N) | Sb leaching amount according to immersion time (ppb) | | | |
|---|---|---|---|---|---|
| | | 24 hr | 48 hr | 70 hr | 94 hr |
| Example 1 | 203 | 0 | 0 | 0 | 0 |
| Comparative Example 1 | 194 | 1.197 | 1.463 | 1.572 | 1.732 |
| Example 2 | 54 | 0 | 0 | 0 | 0 |
| Example 3 | — | 0 | 0 | 0 | 0 |
| Example 4 | 88 | 0 | 0 | 0 | 0 |
| Example 5 | 201 | 0 | 0 | 0 | 0 |
| Example 6 | 192 | 0 | 0 | 0 | 0 |
| Example 7 | 85 | 0 | 0 | 0 | 0 |
| Example 8 | 79 | 0 | 0 | 0 | 0 |
| Example 9 | 203 | 0 | 0 | 0 | 0 |

Referring to Table 2, since the tricot fabrics according to Examples were prepared by polymerization of a polyester resin using a catalyst not including an antimony-based catalyst, as a result of the leaching test, it can be seen that antimony was hardly detected. In addition, the tricot fabrics according to Examples 1, 5, and 9 exhibited excellent strength, whereas Example 2 in which a thermal treatment temperature was excessively low, Examples 4 and 6 in which thermal treatment times were excessively short and long, respectively, and Example 7 without a core part exhibited degraded strength. Additionally, Example 8 exhibited low strength because polymerization did not smoothly proceed due to an excessively low catalyst concentration.

According to a spiral-wound filter module of the present invention, even when water is stagnant in the filter module for a prolonged time, the concentration of a heavy metal leached into water filtered through the filter is substantially reduced, and thus safe drinking water can be supplied.

What is claimed is:

1. A spiral-wound filter module comprising:
   a filtered-water flow channel sheet including a fabric exhibiting almost no heavy metal leaching;
   a separation membrane sheet; and
   an influent-water flow channel sheet,
   wherein the fabric exhibiting almost no heavy metal leaching is a tricot knitted fabric formed by knitting sheath-core polyester fibers including antimony (Sb) in an amount of 1 ppb or less,
   wherein each of a core-part polyester resin and a sheath-part polyester resin constituting the sheath-core polyester fibers is a resin that is polymerized by using a polymerization catalyst including only a titanium (Ti)-based catalyst,
   wherein the fabric exhibiting almost no heavy metal leaching allows a heavy metal having an atomic weight of 63 g/mol to 200 g/mol and a density of 4 g/cm$^3$ or more to be leached in a leaching amount of 1 ppb or less,
   wherein the leaching amount is obtained by a specimen prepared by cutting the fabric exhibiting almost no heavy metal leaching so as to have a weight of 0.7 g is immersed in 1,000 g of deionized water (DI water) having a purity of 99.9% or more for 100 hours and then taken out, and a concentration of a metal element leached into the deionized water is measured,
   wherein the sheath-part polyester resin has a melting point in the range of 150° C. to 180° C.,
   wherein the core-part polyester resin and the sheath-part polyester resin are prepared by performing an esterification and a condensation polymerization of a mixture containing an acid component, a diol component, and the titanium-based catalyst,
   wherein the acid component of the core-part polyester resin and the sheath-part polyester resin includes one or more selected from among terephthalic acid (TPA) and isophthalic acid,
   wherein the diol component of the core-part polyester resin includes 1,4-butandiol,
   wherein the sheath-core polyester fibers of the tricot knitted fabric are heat treated at 170 to 250° C. for 30 seconds to 3 minutes.

2. The spiral-wound filter module of claim 1, wherein a melting point of the core-part polyester resin is higher than a melting point of a sheath-part polyester resin.

3. The spiral-wound filter module of claim 2, wherein the fabric exhibiting almost no heavy metal leaching is formed by fusing at least a portion of the polyester fiber in the sheath part.

4. The spiral-wound filter module of claim 1, wherein the spiral-wound filter module is in a form in which a laminate formed by sequentially laminating a first separation membrane sheet, the filtered-water flow channel sheet, a second separation membrane sheet, and the influent-water flow channel sheet one or more times is spirally wound,
   wherein each of the first separation membrane sheet and the second separation membrane sheet is the said separation membrane sheet.

* * * * *